(12) United States Patent
Rao et al.

(10) Patent No.: US 9,817,578 B2
(45) Date of Patent: Nov. 14, 2017

(54) DATA STORAGE SPACE RECOVERY

(71) Applicant: eBay Inc., San Jose, CA (US)

(72) Inventors: Vinay Pundalika Rao, San Jose, CA (US); Mark S. Lewis, Pleasanton, CA (US); Anna Povzner, San Jose, CA (US)

(73) Assignee: eBay Inc., San Jose, CA (US)

( * ) Notice: Subject to any disclaimer, the term of this patent is extended or adjusted under 35 U.S.C. 154(b) by 48 days.

(21) Appl. No.: 14/732,605

(22) Filed: Jun. 5, 2015

(65) Prior Publication Data

US 2016/0357450 A1 Dec. 8, 2016

(51) Int. Cl.
*G06F 3/06* (2006.01)

(52) U.S. Cl.
CPC .......... *G06F 3/0608* (2013.01); *G06F 3/0604* (2013.01); *G06F 3/0631* (2013.01); *G06F 3/0644* (2013.01); *G06F 3/0647* (2013.01); *G06F 3/0683* (2013.01)

(58) Field of Classification Search
CPC .... G06F 3/0604; G06F 3/0608; G06F 3/0631; G06F 3/0644; G06F 3/0647; G06F 3/0652; G06F 3/067; G06F 3/0683; G06F 12/0253; G06F 12/0261; G06F 12/0269

USPC ........ 707/813, 814, 817, 818, 820; 711/161, 711/162, 165
See application file for complete search history.

(56) References Cited

U.S. PATENT DOCUMENTS

| | | | | |
|---|---|---|---|---|
| 5,692,185 A | * | 11/1997 | Nilsen | G06F 12/0269 707/814 |
| 7,430,645 B2 | * | 9/2008 | Todd | G06F 17/30085 707/999.001 |
| 7,761,486 B2 | * | 7/2010 | Wright | G06F 12/0253 707/813 |

* cited by examiner

*Primary Examiner* — Gary Portka
(74) *Attorney, Agent, or Firm* — Schwegman Lundberg & Woessner, P.A.

(57) ABSTRACT

Storage space is reclaimed by cleaning and compacting data objects where data objects are stored by immutable storage. A storage area of which space needs to be reclaimed is identified. Active and stale data objects stored in a storage area are identified, and only active data objects are transferred to a shadow storage area from the storage area when recovering storage space. I/O operations can be fulfilled from the storage area and the shadow storage area. Compaction requests and I/O requests are throttled according to QOS parameters. Recovery of storage space does not cause a failure to meet performance requirements for any storage volume.

21 Claims, 17 Drawing Sheets

I/O Queue 402
Vol 1: Write data object A
Vol 1: Write B
Vol 1: Write C
Vol 2: Write A
440 → Vol 2: Write D
441 → Vol 1: Write A
444 → Vol 1: Write E
445 → Vol 1: Write F
Vol 1: Delete B
Vol 1: Write C'
Vol 1: Write A'

442  443

SM catalog 241
DOID[A]    addr01    3 | v1,2x; v2,1x
DOID[B]    addr02    1 | v1,1x
DOID[C]    addr03    1 | v1,1x
DOID[D]    addr04    1 | v2,1x
DOID[E]    addr05    1 | v1,1x
DOID[F]    addr06    1 | v1,1x Storage device 137
addr01: data object A
addr02: data object B
addr03: data object C
addr04: data object D
addr05: data object E
addr06: data object F

FIG. 4C

I/O Queue 402
Vol 1: Write data object A
Vol 1: Write B
Vol 1: Write C
Vol 2: Write A
Vol 2: Write D
Vol 1: Write A
Vol 1: Write E
Vol 1: Write F
Vol 1: Delete B
460 → Vol 1: Write C'
Vol 1: Write A'

| Compaction Queue 502 | System Queue 602 | I/O Queue 402 |
|---|---|---|
| Compact A | | Vol 1: Read A |
| Compact B | | Vol 1: Read C' |
| Compact C | | Vol 1: Write G |
| Compact D | | Vol 1: Write B |
| Compact E | | Vol 1: Delete C' |
| Compact F | | Vol 2: Write H |
| Compact C' | | Vol 1: Write A" |
| Compact A' | | |

SM catalog 241
DOID[A]   addr01   2 | v1,1x; v2,1x
DOID[B]   addr02   0 | v1,0x
DOID[C]   addr03   0 | v1,0x
DOID[D]   addr04   1 | v2,1x
DOID[E]   addr05   1 | v1,1x
DOID[F]   addr06   1 | v1,1x
DOID[C']  addr07   1 | v1,1x
DOID[A']  addr08   1 | v1,1x

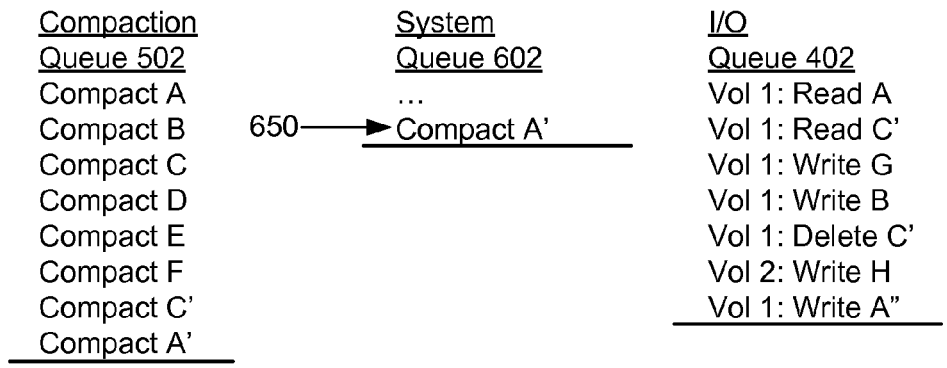

| Compaction Queue 502 | | System Queue 602 | I/O Queue 402 |
|---|---|---|---|
| Compact A | | ... | Vol 1: Read A |
| Compact B | 650 ⟶ | Compact A' | Vol 1: Read C' |
| Compact C | | | Vol 1: Write G |
| Compact D | | | Vol 1: Write B |
| Compact E | | | Vol 1: Delete C' |
| Compact F | | | Vol 2: Write H |
| Compact C' | | | Vol 1: Write A" |
| Compact A' | | | |

```
SM catalog 241
DOID[A]    addr20      2 | v1,1x; v2,1x
DOID[B]    addr24      1 | v1,1x
DOID[C]    addr03      0 | v1,0x
DOID[D]    addr21      1 | v2,1x
DOID[E]    addr22      1 | v1,1x
DOID[F]    addr25      1 | v1,1x
DOID[C']   addr07      0 | v1,0x
DOID[A']   addr08      0 | v1,0x
DOID[G]    addr23      1 | v1,1x
DOID[H]    addr26      1 | v2,1x
DOID[A"]   addr27      1 | v1,1x
```

```
Storage device 137

Storage area (re-use) 504          Storage area (shadow) 506
addr01: data object A              addr20: data object A
addr02: data object B              addr21: data object D
addr03: data object C              addr22: data object E
addr04: data object D              addr23: data object G
addr05: data object E              addr24: data object B
addr06: data object F              addr25: data object F
addr07: data object C'             addr26: data object H
addr08: data object A'             addr27: data object A"
```

FIG. 6E

DATA STORAGE SPACE RECOVERY

BACKGROUND

1. Technical Field

The present invention generally relates to the field of data storage and, more particularly, to reclaiming data storage space.

2. Background Information

As the volume of data stored each year grows, a multitude of costs associated with maintaining this data also grows. The cost of purchasing and powering storage devices is just a fraction of the total cost of ownership. To achieve the reliability, dataset sizes, and performance demanded by modern big data applications, thousands of such devices must be interconnected and managed by complex data storage systems. The costs to purchase, install, and maintain such systems dominate the overall cost of storing any given unit of data. Reclaiming space used to store obsolete, unreferenced data (aka, garbage collection) is an important technique for controlling the growth of storage costs.

Traditional data storage systems eagerly delete from the underlying backing store in response to a user-level delete. Relaxing this requirement can lead to improved performance and simplified design across a wide range of data storage systems, from individual hard disks and SSDs to storage arrays and distributed file systems. Yet data storage systems that defer deletion can accumulate garbage data that is no longer referenced; such garbage consumes storage capacity and decreases throughput. If left unchecked, the cost overhead and performance degradation will become substantial.

Thus, better garbage collection techniques that can bound the total amount of waste while incurring minimal maintenance overhead are important to data storage systems.

SUMMARY

In one example, data objects (DOs) are stored by immutable storage, meaning that data objects are not updated in place at storage nodes. Storage nodes can be divided into partitions and data objects can be stored sequentially within each partition. Data objects that have different content are stored at different physical locations. Data objects are identified by their unique identifiers (DOIDs) which can be calculated based on their content. As a result, data objects that are revised versions of previously stored data objects, are stored at different locations and identified by different DOIDs. Entries for data objects are created and maintained in storage manager (SM) catalogs to record actual storage locations, reference counts, and association entries for data objects. A reference count indicates the number of instances that a data object is currently referenced. An association entry indicates the number of instances that a data object is currently referenced in each storage volume. Data objects which have reference counts of zero are stale. Stale data objects can be expunged to recover storage space.

In one approach, storage space is reclaimed by cleaning and compacting data objects. A storage area where space can be reclaimed is identified. Active and stale data objects in the storage area are identified, and only active data objects are transferred from the old storage area to a new storage area (a shadow storage area). For active data objects that are transferred to the shadow storage area, SM catalogs are updated with the new storage locations in the shadow storage area. When the transfer of active data objects is completed, the old storage area can be reused for additional storage. This recovery of storage space can be performed in conjunction with normal I/O operations without degrading I/O performances. I/O operations can be fulfilled from the old storage area and the new shadow storage area. Storage space recovery is initiated by compaction (i.e., transfer) requests according to a policy that could be based on available storage capacity threshold crossing or, alternately, based on time. Compaction requests and I/O requests are throttled according to QOS parameters. Accordingly, the recovery of storage space does not cause a failure to meet performance requirements for any storage volume.

Other aspects include components, devices, systems, improvements, methods, processes, applications, computer readable mediums, and other technologies related to any of the above.

BRIEF DESCRIPTION OF THE DRAWINGS

FIGS. 4A-4F are diagrams illustrating immutable data object storage.

FIGS. 6A-6F are diagrams illustrating compaction requests interspersed with I/O requests.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
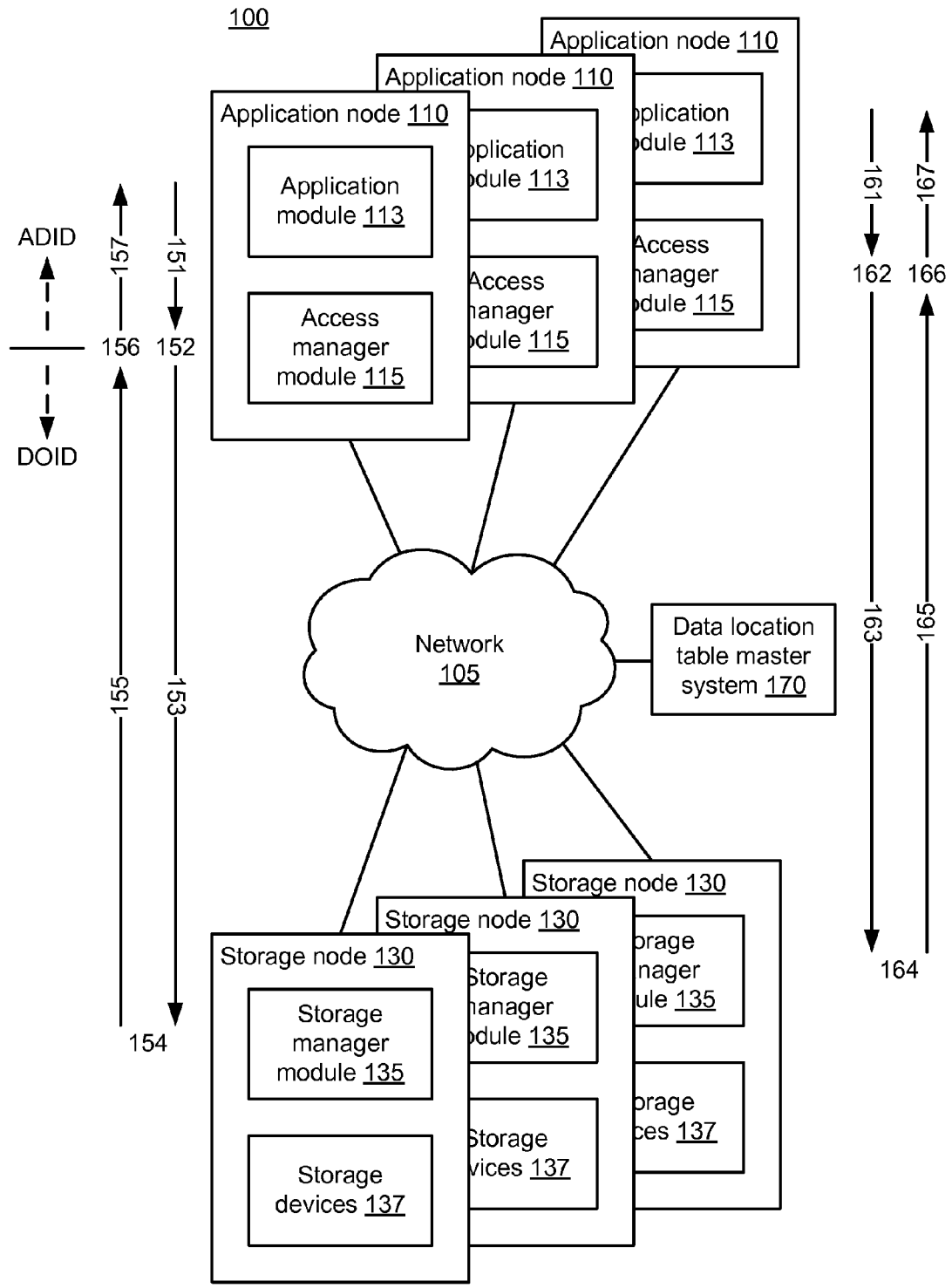
FIG. 1 is a high-level block diagram illustrating an environment for storing data, according to one embodiment.

FIG. 1 is a high-level block diagram illustrating an environment 100 for storing data, according to one embodiment. An example of such an environment is described in further detail in U.S. patent application Ser. No. 13/957,849, "High-Performance Distributed Data Storage System with Implicit Content Routing and Data Deduplication" (case 24156), which is incorporated herein by reference in its entirety. The environment 100 may be maintained by an enterprise, such as a corporation, university, or government agency. As shown, the environment 100 includes a network 105, multiple application nodes 110, and multiple storage nodes 130. While three application nodes 110 and three storage nodes 130 are shown in the embodiment depicted in FIG. 1, other embodiments can have different numbers of application nodes 110 and/or storage nodes 130. The environment 100 may also include a data location table (DLT) master system 170.

The network 105 represents the communication pathway between the application nodes 110 and the storage nodes 130. In one embodiment, the network 105 uses standard communications technologies and/or protocols and can include the Internet. Thus, the network 105 can include links using technologies such as Ethernet, 802.11, InfiniBand, PCI Express Advanced Switching, etc. Similarly, the networking protocols used on the network 105 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 105 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 105 can use custom and/or dedicated data communications technologies instead of, or in addition to, the ones described above.

An application node 110 is a computer (or set of computers) that provides standard application functionality and data services that support that functionality. The application node 110 includes an application module 113 and an access manager module (AM module) 115. The application module 113 provides standard application functionality such as serving web pages, archiving data, or data backup/disaster recovery. In order to provide this standard functionality, the application module 113 issues write requests (i.e., requests to store data) and read requests (i.e., requests to retrieve data). The access manager module 115 handles these application write requests and application read requests. The access manager module 115 is further described below with reference to FIG. 2A.

A storage node 130 is a computer (or set of computers) that stores data. The storage node 130 can include one or more types of storage devices 137, such as hard disk, optical disk, flash memory, and cloud. The storage nodes 130 can be multi-layer and/or virtual, for example as described in U.S. patent application Ser. No. 14/074,584, "Multi-layer Data Storage Virtualization Using a Consistent Data Reference Model" (case 24159), which is incorporated herein by reference in its entirety. The storage node 130 includes a storage manager module (SM module) 135. The storage manager module 135 handles data requests received via the network 105 from the access manager module 115 (e.g., access manager write requests and access manager read requests). This typically includes reading and writing to storage devices 137, and bookkeeping functions such as updating tables of what data is located where. The storage manager module 135 is further described below with reference to FIG. 2B.

Typically, stored data is divided into storage volumes. Clients, through the application nodes 110, typically will request creation of storage volumes for the storage of their data. Storage volumes may have associated performance requirements, such as minimum I/O operations per second (IOPS), maximum IOPS and priority level. These may be specified in service level agreements, for example. The storage volumes are assigned to storage node(s) 130 and may be spread across multiple storage nodes and storage devices within those storage nodes. The performance requirements may be different for different storage volumes, even though multiple storage volumes may be stored on the same storage node or on the same storage device.

Performance requirements are often expressed as quality of service (QOS) parameters. Examples of QOS parameters include service level agreements or performance specified in service level agreements, I/O priority, and minimum and maximum input/output operations per second (IOPS). Service level agreements may specify minimum down time, maximum recovery time, maximum latency, etc. I/O priority is typically some sort of priority order. For example, storage volumes with I/O priority 1 may have priority over those with I/O priority 2, which have priority over those with I/O priority 3, etc. Minimum IOPS typically is the minimum throughput which must be available from the data storage environment at all times. In other words, the data storage environment must be able to support a situation where the storage volume is continuously operating at the minimum IOPS rate. Maximum IOPS typically specifies a burst rate which must be available from the data storage environment. If the storage volume has burst activity up to the maximum IOPS rate, the data storage environment must support that burst activity. However, it is not required to support burst activity above this rate nor is it required to support this rate for long periods of time or for continuous operation.

The data itself is represented as data objects (DO). Unlike many types of storage, data objects can vary widely in size and characteristics. Examples of data objects include emails, images, audio files, video files, system logs, key-value store data, volume blocks, unstructured data, data structured specifically for certain database or other applications, etc. An application data identifier (ADID) is the identifier used by the application module 113 to refer to the data object within the application. The application data identifier can be, for example, a file name, an object name, or a range of blocks. A data object identification (DOID) is a unique address that is used as the primary reference for placement and retrieval of the data object within the storage nodes 130. The access manager module 115 translates between ADID and DOID. The DLT master system 170 maintains tables indicating which partitions of data objects are stored at which storage nodes, including indicating the locations of redundant storage if so desired. Relevant tables from the DLT master system 170 may be mirrored on the access manager modules 115 and/or storage manager modules 135.

Basic read/write operation of system 100 is as follows. With respect to writing data to storage, the application module 113 sends an application write request 151 to the access manager module 115. The application write request includes a data object and an application data identifier. The access manager module 115 determines 152 a pending DOID corresponding to the application data identifier and determines 152 one or more storage nodes 130 on which the DO should be stored. The AM module 115 sends an access manager (AM) write request 153 to the storage nodes 130. The AM write request includes the data object and the DOID. In step 154, the SM module 135 finalizes the pending DOID, stores the DO and updates a local catalog by adding an entry mapping the DO's finalized DOID to the actual storage location on the storage device 137 where the DO was stored. The SM module 135 sends an acknowledgment 155 to the AM module 115, which does some local bookkeeping 156 and sends an acknowledgment 157 to the application module 113.

Reading data from storage operates similarly. The application module 113 sends an application read request 161 to the AM module 115. The application read request includes an application data identifier. The access manager module 115 determines 162 the DOID corresponding to the application data identifier and determines 162 one or more storage nodes 130 on which the DO is stored. The AM module 115 sends an access manager (AM) read request 163 to the appropriate storage nodes 130. The AM read request includes the DOID. In step 164, the SM module 135 determines the actual storage location from the DOID and retrieves the data object from the corresponding storage device 137. The SM module 135 sends 165 the data object to the AM module 115, which does some local bookkeeping 166 and sends 167 the data object to the application module 113.

Note that in both read and write operations, while the application module 113 refers to data using application data identifiers, DOIDs are used by the AM module 115 and the SM module 135. The AM module 115 converts between application data identifiers and DOIDs. In addition, the DOIDs are unique for each data object and preferably are calculated based on the content of the data object.

Also note that many application modules 113 may be requesting read and write of many data objects from many storage volumes spanning many storage nodes 130 and storage devices 137. These I/O requests preferably are prioritized in a manner that meets performance requirements for the different storage volumes. Examples of different approaches are described in U.S. patent application Ser. No. 14/229,690, "Efficient Scalable I/O Scheduling" (case 25875) and Ser. No. 14/613,779, "Dynamic Storage Tiering Based on Performance SLAs" (case 27845), which are incorporated herein by reference in their entirety. In addition, redundancy or replication may also be implemented in the data storage, for example as described in U.S. patent application Ser. No. 14/495,431, "Assigning Storage Responsibility in a Distributed Data Storage System with Replication" (case 26555), which is incorporated herein by reference in its entirety.

Figure 2A:
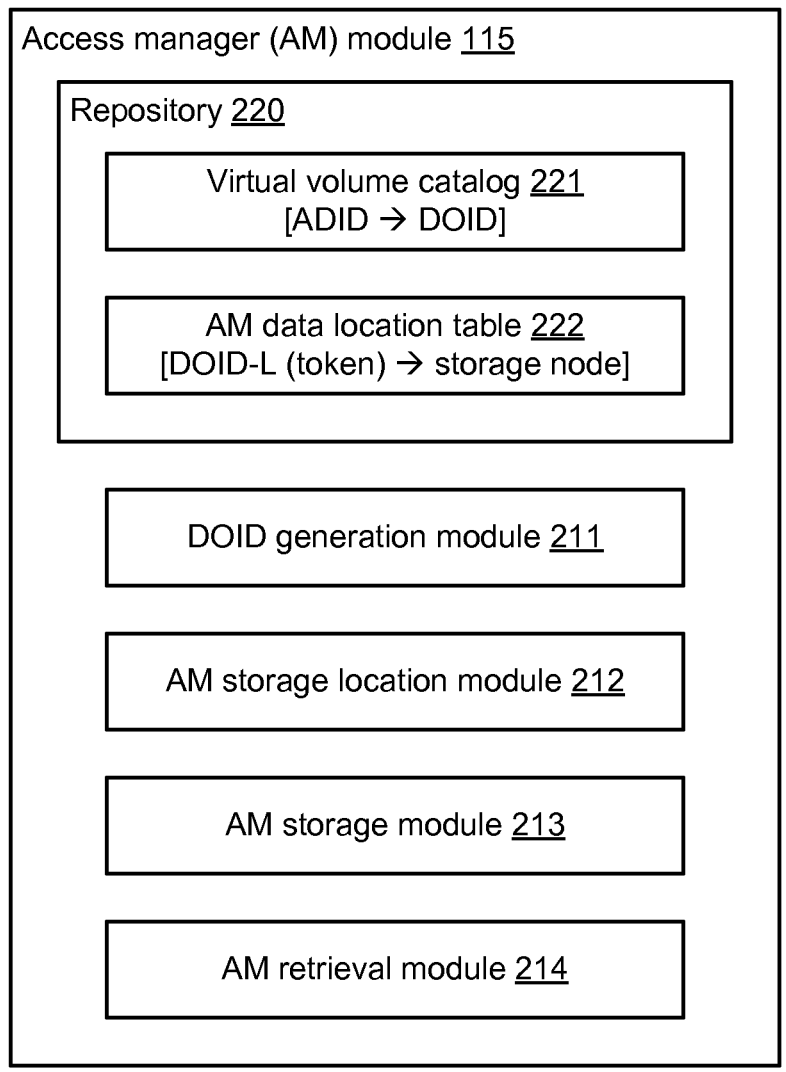
FIG. 2A is a high-level block diagram illustrating the access manager (AM) module from FIG. 1, according to one embodiment.

FIG. 2A is a high-level block diagram illustrating the access manager module 115 from FIG. 1, according to one embodiment. The AM module 115 includes a number of functional modules and a repository 220 which contains data. In this example, the functional modules include a DOID generation module 211, an access manager (AM) storage location module 212, an access manager (AM) storage module 213, and an access manager (AM) retrieval module 214.

The repository 220 stores a virtual volume catalog 221 and a data location table 222 (sometimes referred to as the AM data location table 222). The virtual volume catalog 221 stores mappings between application data identifiers (ADIDs) and data object identifications (DOIDs). One application data identifier is mapped to one DOID. The DOID is a unique address that is used as the primary reference for placement and retrieval of a data object. Updates to the virtual volume catalog 221 may be stored by one or more storage nodes 130. This embodiment provides a redundant, non-volatile, consistent replica of the virtual volume catalog 221 data within the environment 100. In this embodiment, when a access manager module 115 is initialized or restarted, the appropriate copy of the virtual volume catalog 221 is loaded from a storage node 130 into the access manager module 115. In one embodiment, the storage nodes 130 are assigned by volume ID (i.e., by each unique storage volume), as opposed to by DOID. In this way, all updates to the virtual volume catalog 221 will be consistent for any given storage volume.

The data location table 222 stores data object placement information, such as mappings between DOID Locators ("DOID-Ls" or "tokens", the first 4 bytes of DOIDs in this example) and storage nodes. One DOID-L is mapped to one or more storage nodes (indicated by storage node identifiers). The AM data location table 222 is the relevant portion of the global mapping information maintained by the DLT master system 170. That is, the DLT master system 170 maintains data location tables for the entire system, while the AM data location table 222 is the information relevant to the specific access manager module 115. The one to many mapping can be used to implement redundancy. A storage node identifier is, for example, an IP address or another identifier that can be directly associated with an IP address. In one embodiment, the mappings are stored in a relational database to enable rapid access. For example, see U.S. patent application Ser. No. 14/495,431, "Assigning Storage Responsibility in a Distributed Data Storage System with Replication" (case 26555), which is incorporated herein by reference in its entirety.

In one embodiment, a DOID-L is a four-byte value that can range from [00 00 00 00] to [FF FF FF FF], which provides more than 429 million individual data object locations. Since the environment 100 will generally include fewer than 1000 storage nodes, a storage node would be allocated many (e.g., thousands of) DOID-Ls to provide a good degree of granularity. In general, more DOID-Ls are allocated to a storage node 130 that has a larger capacity, and fewer DOID-Ls are allocated to a storage node 130 that has a smaller capacity.

The DOID generation module 211 takes as input a data object, generates a data object identification (DOID) for that object, and outputs the generated DOID. In one embodiment, the DOID generation module 211 generates the DOID in part based on hashing the content of the data object. The AM storage location module 212 takes as input a DOID, determines the one or more storage nodes associated with the DOID, and outputs the one or more storage nodes (indicated by storage node identifiers). The AM storage module 213 takes as input an application write request, processes the application write request, and outputs a access manager (AM) write acknowledgment. The AM retrieval module 214 takes as input an application read request, processes the application read request, and outputs a data object.

Figure 2B:
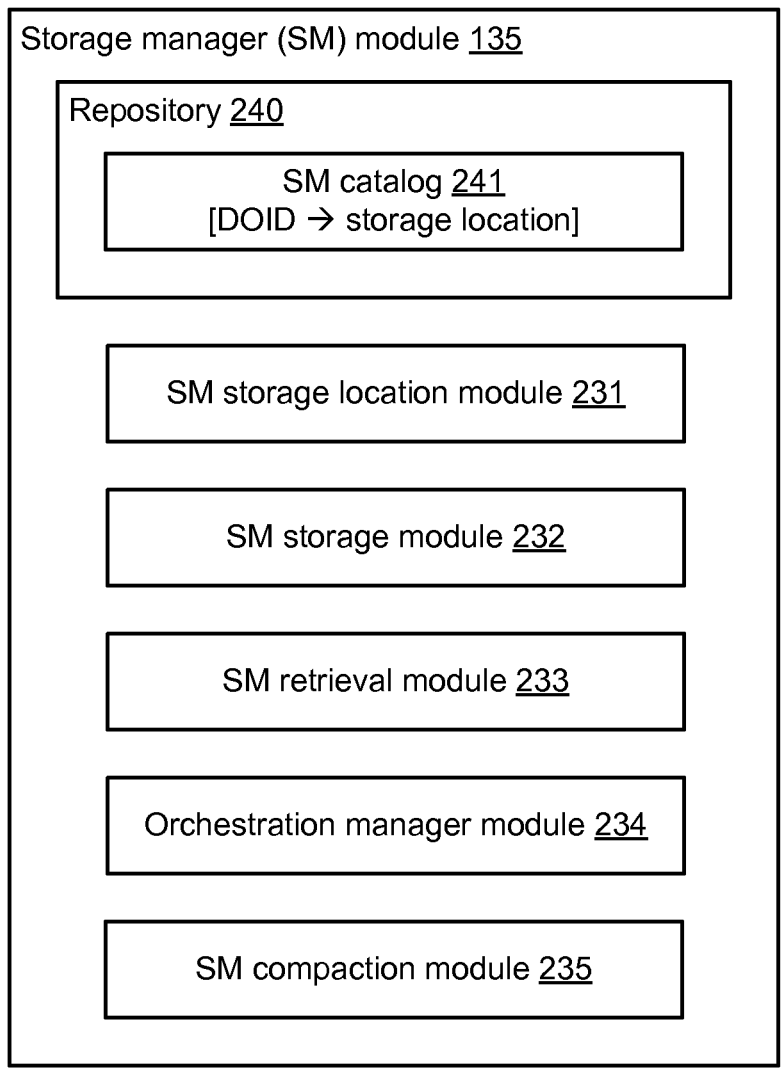
FIG. 2B is a high-level block diagram illustrating the storage manager (SM) module from FIG. 1, according to one embodiment.

FIG. 2B is a high-level block diagram illustrating the storage manager module 135 from FIG. 1, according to one embodiment. The SM module 135 includes a number of functional modules and a repository 240 which contains data. In this example, the functional modules include storage location module 231, a storage manager (SM) storage module 232, a storage manager (SM) retrieval module 233, an orchestration manager module 234, and a storage manager (SM) recovery module 235.

The repository 240 stores a SM catalog 241. The SM catalog 241 stores mappings between data object identifications (DOIDs) and actual storage locations (e.g., on hard disk, optical disk, flash memory, and cloud). One DOID is mapped to one actual storage location within a storage node. For a particular DOID, the data object associated with the DOID is stored at the actual storage location. The same data object may be stored on multiple different storage nodes to implement redundancy. In some implementations, the repository 240 may also store a storage manager data location table (not shown in FIG. 2B). Similar to the AM data location table, the SM data location table may contain the data from the DLT master system 170 which is relevant to this particular storage node 130.

The SM storage location module 231 takes as input a DOID, determines the actual storage location associated with the DOID, and outputs the actual storage location. The SM storage module 232 takes as input an AM write request, processes the AM write request, and outputs a SM write acknowledgment. This processing includes resolving hash collisions. The SM retrieval module 233 takes as input an AM read request, processes the AM read request, and outputs a data object.

The orchestration manager module 234 performs storage allocation and tuning among the various storage nodes 130. Only one storage node 130 within the environment 100 needs to include the orchestration manager module 234. However, in one embodiment, multiple storage nodes 130 within the environment 100 (e.g., four storage nodes) include the orchestration manager module 234. In that embodiment, the orchestration manager module 234 runs as a redundant process.

The SM compaction module 235 cleans and compacts stale data objects to reclaim storage space on the storage device 137. In one approach, the SM compaction module 235 operates periodically to compact data objects stored over a range of addresses. In one embodiment, a storage node is divided into partitions and storage space is recovered on a per-partition basis. For each partition, the SM compaction module 235 may iterate over the SM catalog 241 to determine a ratio of stale to active data objects and prioritize the partitions based on their ratios. Partitions having higher ratios of stale data objects are prioritized over those having lower ratios.

The SM compaction module 235 manages compaction requests through the use of compaction queues. In one approach, the SM compaction module 235 processes the data objects one at a time: consider a data object, determine whether the data object is active, transfer the data object to a shadow storage area if it is active, then consider the next data object. Alternatively, the SM compaction module 235 determines all data objects in a partition at once, making a list of which data objects are active and then transferring them one by one.

The SM compaction module 235 reclaims storage space on the storage device 137 while SM storage module 232 and SM retrieval module 233 are processing I/O requests. I/O requests and compaction requests are intermingled such that I/O performance is not degraded. Processing of I/O requests may be temporarily paused when a compaction operation with respect to an active data object is being processed. Compaction requests and I/O requests preferably are throttled according to QOS parameters. Accordingly, SM compaction module 235 does not cause a failure to meet performance requirements for any storage volume. The SM compaction module 235 may initiate storage space recovery according to a policy that is based on available storage capacity or one that is based on time. For example, when the available storage space for a storage device 137 (or for a partition) falls below a threshold (e.g., 20-30%) of the total storage capacity, the SM compaction module 235 initiates storage space recovery.

Storage nodes 130 can be added to (and removed from) the environment 100 dynamically. Adding (or removing) a storage node 130 will increase (or decrease) linearly both the capacity and the performance of the overall environment 100. When a storage node 130 is added, data objects are redistributed from the previously-existing storage nodes 130 such that the overall load is spread evenly across all of the storage nodes 130, where "spread evenly" means that the overall percentage of storage consumption will be roughly the same in each of the storage nodes 130. In general, the orchestration manager module 234 balances base capacity by moving DOID-L segments from the most-used (in percentage terms) storage nodes 130 to the least-used storage nodes 130 until the environment 100 becomes balanced.

Recall that the data location tables (whether at the DLT master system 170, in the access manager module 115 or in the storage manager module 135) stores mappings (i.e., associations) between DOID-Ls and storage nodes. The aforementioned data object redistribution is indicated in the data location tables by modifying specific DOID-L associations from one storage node 130 to another. Once a new storage node 130 has been configured and the relevant data object has been copied, an access manager module 115 will receive a new data location table reflecting the new allocation. Data objects are grouped by individual DOID-Ls such that an update to the data location table in each access manager module 115 can change the storage node(s) associated with the DOID-Ls. Note that the existing storage nodes 130 will continue to operate properly using the older version of the data location table until the update process is complete. This proper operation enables the overall data location table update process to happen over time while the environment 100 remains fully operational.

In one embodiment, the orchestration manager module 234 also controls the registration of new storage volumes, for example as described in U.S. patent application Ser. No. 14/673,723, "Volume Admission Control for High-Performance Distributed Data Storage" (case 28716), which is incorporated herein by reference in its entirety.

The DLT master system 170 maintains a master data location table (mDLT) and updates the mDLT as necessary. For example, the DLT master system 170 updates the mDLT when one or more storage nodes 130 come online, when one or more storage nodes 130 go offline, when weights of one or more storage nodes 130 change, or any combination thereof. The DLT master system 170 sends the updated mDLT 530 to the application nodes 110 and the storage nodes 130.

As described previously, DOID Locators (aka, tokens) correspond to partitions of data objects. The mDLT maintains the assignment of tokens to storage nodes. A token may be assigned to more than one storage node, for example to implement redundancy. In that case, different storage nodes may have different levels of responsibility for a particular token. For example, the mDLT may indicate that a particular storage node has primary responsibility for a taken, while other storage nodes have secondary (i.e., redundancy) responsibility for the same token. The DLT master system 170 preferably deterministically allocates secondary and primary responsibilities based on the storage nodes' capabilities. For example, see U.S. patent application Ser. No. 14/495,431, "Assigning Storage Responsibility in a Distributed Data Storage System with Replication" (case 26555), which is incorporated herein by reference in its entirety.

Figure 3:
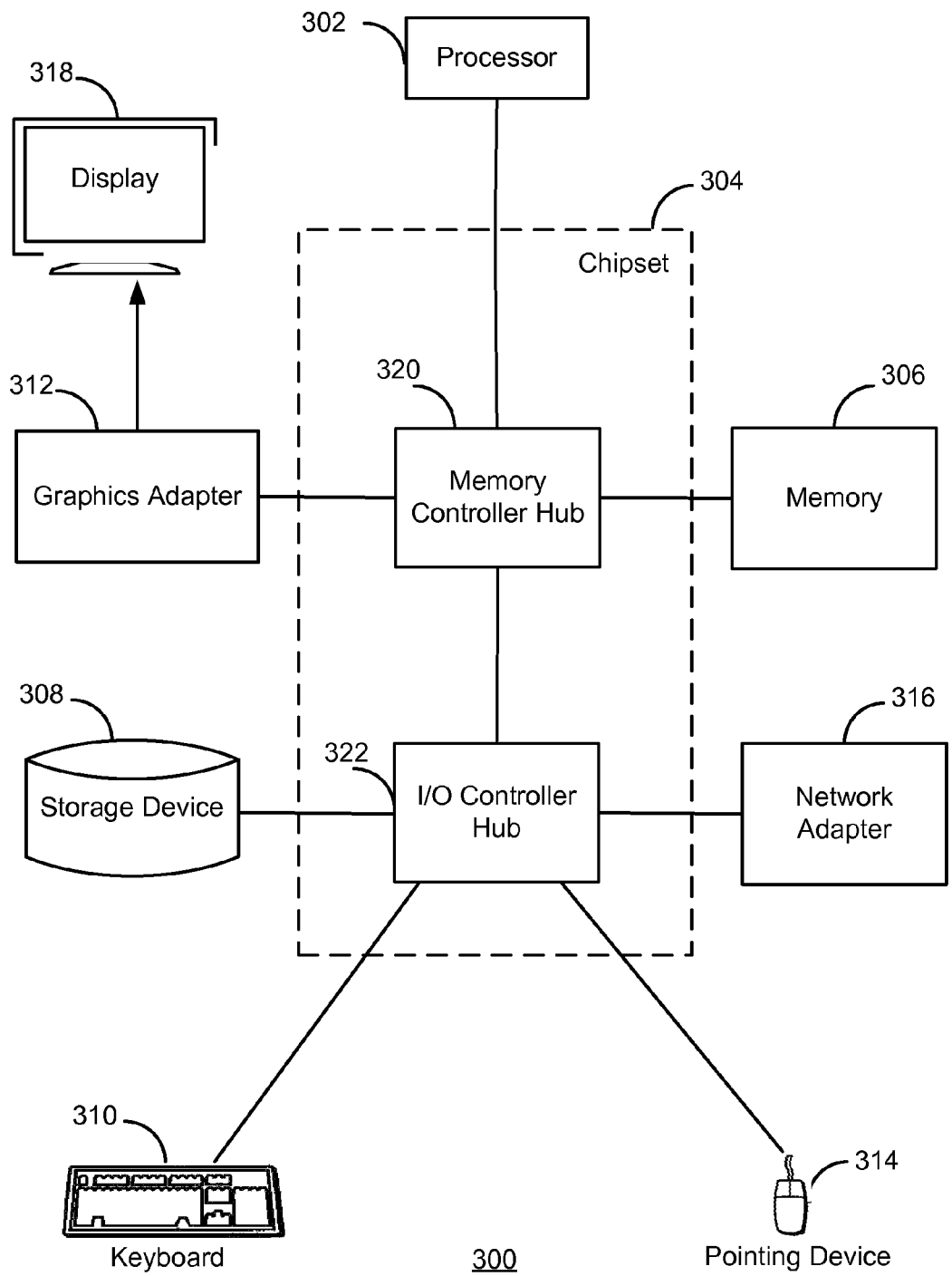
FIG. 3 is a high-level block diagram illustrating an example of a computer for use as one or more of the entities illustrated in FIG. 1, according to one embodiment.

FIG. 3 is a high-level block diagram illustrating an example of a computer 300 for use as one or more of the entities illustrated in FIG. 1, according to one embodiment. Illustrated are at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display device 318 is coupled to the graphics adapter 312. A storage device 308, keyboard 310, pointing device 314, and network adapter 316 are coupled to the I/O controller hub 322. Other embodiments of the computer 300 have different architectures. For example, the memory 306 is directly coupled to the processor 302 in some embodiments.

The storage device 308 includes one or more non-transitory computer-readable storage media such as a hard drive, compact disk read-only memory (CD-ROM), DVD, or a solid-state memory device. The memory 306 holds instructions and data used by the processor 302. The pointing device 314 is used in combination with the keyboard 310 to input data into the computer system 300. The graphics adapter 312 displays images and other information on the display device 318. In some embodiments, the display device 318 includes a touch screen capability for receiving user input and selections. The network adapter 316 couples the computer system 300 to the network 105. Some embodiments of the computer 300 have different and/or other components than those shown in FIG. 3. For example, the application node 110 and/or the storage node 130 can be formed of multiple blade servers and lack a display device, keyboard, and other components.

The computer 300 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 308, loaded into the memory 306, and executed by the processor 302.

FIGS. 4A-4F are diagrams illustrating immutable data object storage where data objects are not updated in place at storage nodes. That is, different versions of a data object correspond to different DOIDs and are stored at different physical locations at a storage node. If an existing data object stored at a physical location is changed, it is not replaced by the new version. Rather, the new version will be stored at a different physical location.

Figure 4A:
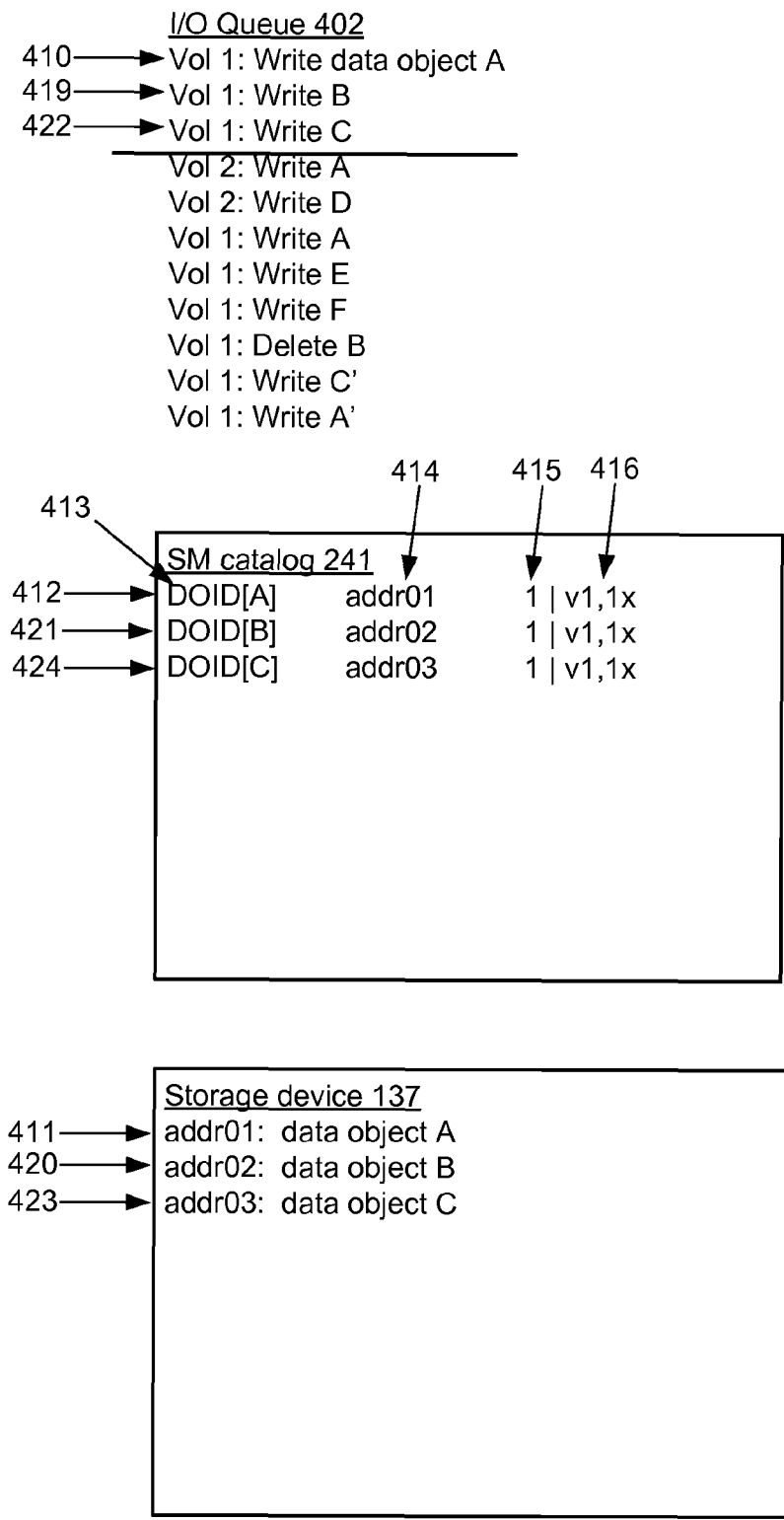

In various embodiments, read and write requests to storage nodes 130 are managed by I/O queues. As illustrated in FIG. 4A, an I/O queue 402 includes I/O operations (e.g., read, write, delete) requested by application modules 113. FIG. 4A shows an I/O queue 402 with 11 I/O requests, starting with "Vol 1: Write data object A" and ending with "Vol 1: Write (data object) A'." Data objects are organized into storage volumes and I/O operations relate to different data objects and different storage volumes. When a write request is received to store a data object, the data object is stored at the storage node 130 according to the write request. For example, the I/O operation "Vol 1: Write data object A" is a request by storage volume 1 to store a data object A. "Vol 1: Write B" is a request by storage volume 1 to store a different data object B. "Vol 2: Write A" is a request by storage volume 2 to store data object A. "Vol 1: Delete B" is a request by storage volume 1 to delete data object B. In these examples, data object B is different than data object A (i.e., data objects A and B have different application data identifiers), but data object A' is a modified version of data object A (i.e., data objects A and A' have the same application data identifier but different contents and therefore different DOID). FIGS. 4A-4F illustrate processing of the requests in I/O queue 402.

FIG. 4A illustrates processing of the first three requests, as indicated by the horizontal line. The SM catalog 241 stores mappings between DOIDs and actual storage locations. When a new data object is stored, the SM catalog 241 is updated with the mapping between the DOID and the actual storage location of the data object. For example, consider the first I/O request 410, which is a request by storage volume 1 to store a data object A. The data object A is stored at addr01 of the storage device 137, as shown by arrow 411. When the data object A is stored, the SM catalog 241 is updated with the mapping 412 between the DOID 413 of the data object A, which is denoted as DOID[A], and the actual storage location 414 addr01 of the data object A. In addition to storing mappings between DOIDs and actual storage locations of data objects, the SM catalog 241 also stores reference counts 415 and association entries 416 for data objects. A reference count is a count of a number of instances of a data object that is currently referenced. The association entry is per storage volume and indicates a number of instances of a data object that is currently referenced in each storage volume. In this example, because the data object A is new and stored for the first time, the reference count 415 of the data object A is 1, indicating that data object A is currently being referenced once across all storage volumes. The association entry 416 for data object A is "v1,1×", which indicates that storage volume 1 references data object A 1 time.

The next I/O request 419 is processed similarly. It is a request by storage volume 1 to store data object B. Data object B is new, so it is stored 420 at a new storage location addr02, and a corresponding entry 421 is added to the SM catalog 241. I/O request 422 is processed similarly. Data object C is stored 423 at a new storage location addr03, and a corresponding entry 424 is added to the SM catalog 241. In one approach, data objects are stored sequentially and entries are added sequentially in SM catalogs. Because the DOIDs are unique and determined based on content of data objects, the DOIDs of the data objects A, B, C are different. Within a storage node 130, because one DOID is mapped to one actual storage location, the actual storage location of the data object can be determined from the SM catalog 241 based on the DOID.

Figure 4B:
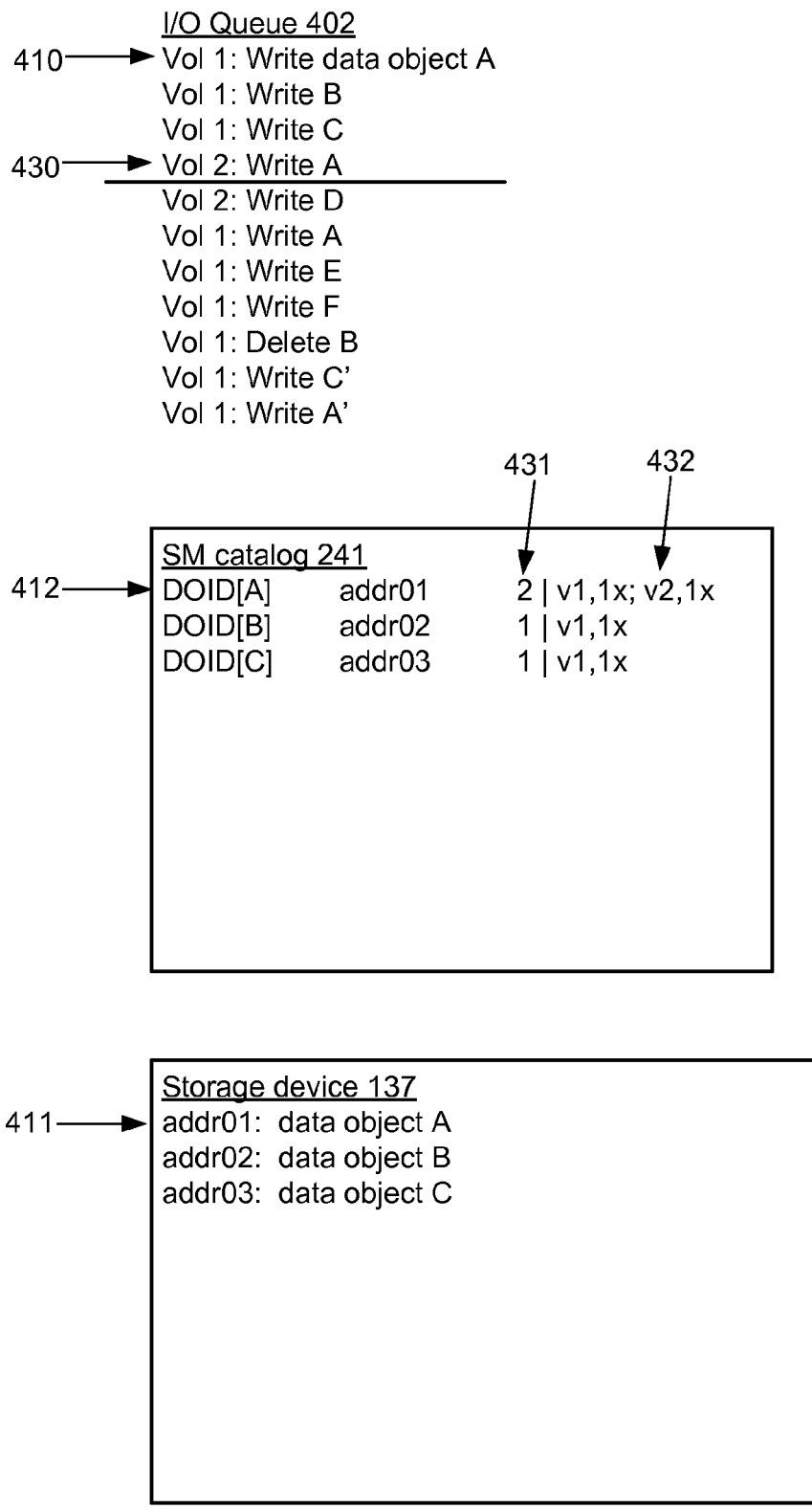

FIG. 4B illustrates the processing of I/O operation 430, which is a write request by storage volume 2 to store data object A. However, the data object A has already been stored by the I/O operation 410, which is a write request by storage volume 1 to store the data object A. For example, perhaps a file is attached to an email application and opened by different users using different email applications but using the same backend storage. Therefore, there is no need to store data object A in the storage device 137, because it is already stored 411. There is also no need to add an entry for data object A in the SM catalog 241, because it already has an entry 412. However, the reference count 431 and the association entry 432 are updated. The reference count 431 is incremented to 2 because the data object A is currently being referenced twice: once by storage volume 1 and once by storage volume 2. The association entry 432 is updated to indicate that the data object A is currently being referenced once in storage volume 1 and once in storage volume 2.

FIG. 4C illustrates the processing of the next four I/O operations, beginning with I/O operation 440. I/O request 440 is processed the same as described in FIG. 4A, resulting in data object D stored at addr04 and a corresponding entry added to the SM catalog 241.

I/O request 441 is another write request by storage volume 1 to store data object A. Because the data object A is stored at the storage device 137 from the previous write requests, the data object A is not re-stored at the storage device 137. However, in the SM catalog 241, the reference count 442 and the association entry 443 associated with DOID 424 are updated. The reference count 442 is incremented to indicate that the total number of instances the data object A currently being referenced is 3: twice in storage volume 1 and once in storage volume 2. The association entry 443 is updated to indicate that data object A is now referenced 2× by storage volume 1.

I/O requests 444 and 445 are processed the same as before, resulting in new data objects E and F stored at the storage device 137 and corresponding entries in the SM catalog 241.

Figure 4D:
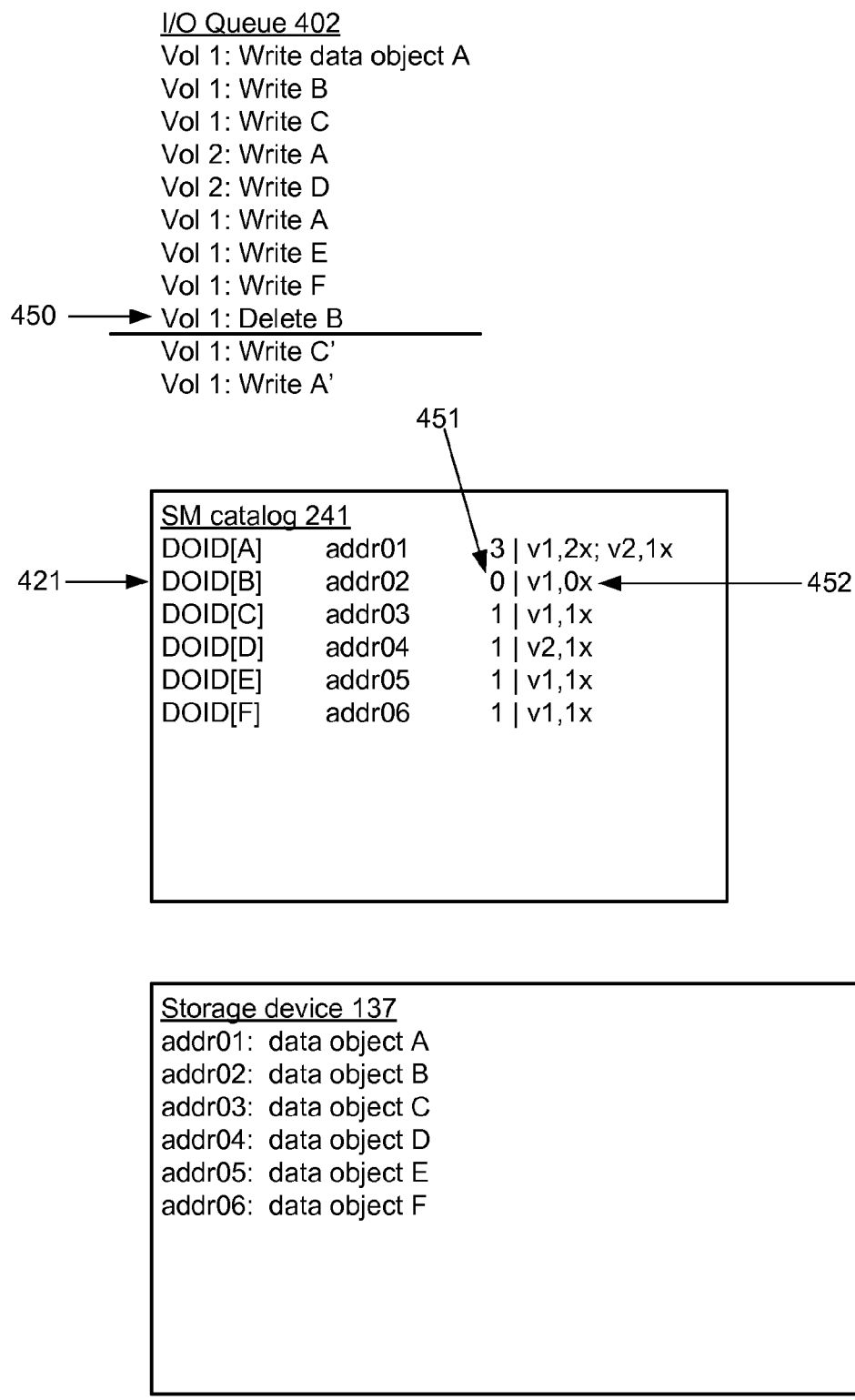

FIG. 4D illustrates processing a request 450 to delete data object B. The data object B is not physically deleted from the storage device 137. Notice that there is no change in the storage device 137 relative to FIG. 4C. However, the SM catalog 241 is updated. In entry 421, the reference count 451 and the association entry 452 for the data object B are updated. The reference count 451 for the data object B is decremented to 0, which indicates that the data object B is not currently being referenced by any storage volume. The association entry 452 is also updated to indicate that the number of instances of data object B being currently referenced in storage volume 1 is 0. Data objects that are not currently being referenced are referred to as stale data objects. The SM catalog 241 may further record a timestamp when a data object becomes stale and/or the time period for which the data object has been stale.

Figure 4E:
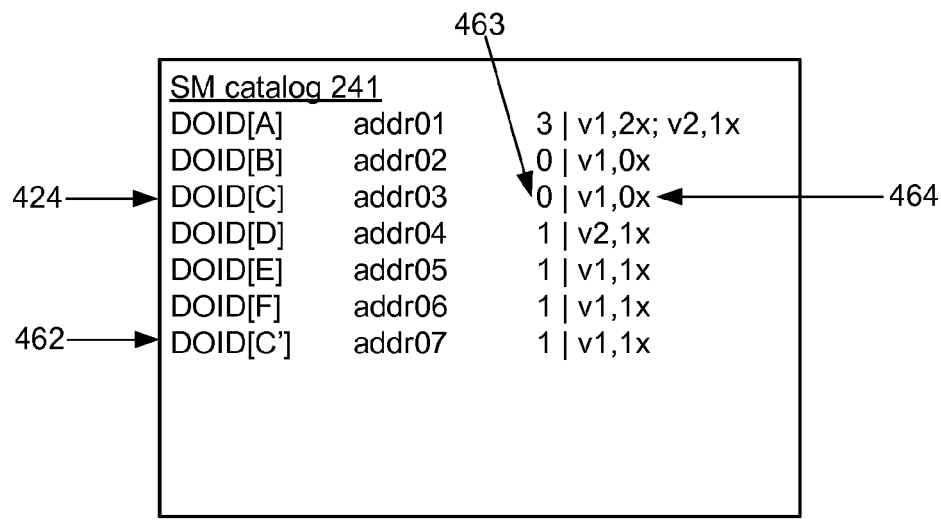
Figure 4E:
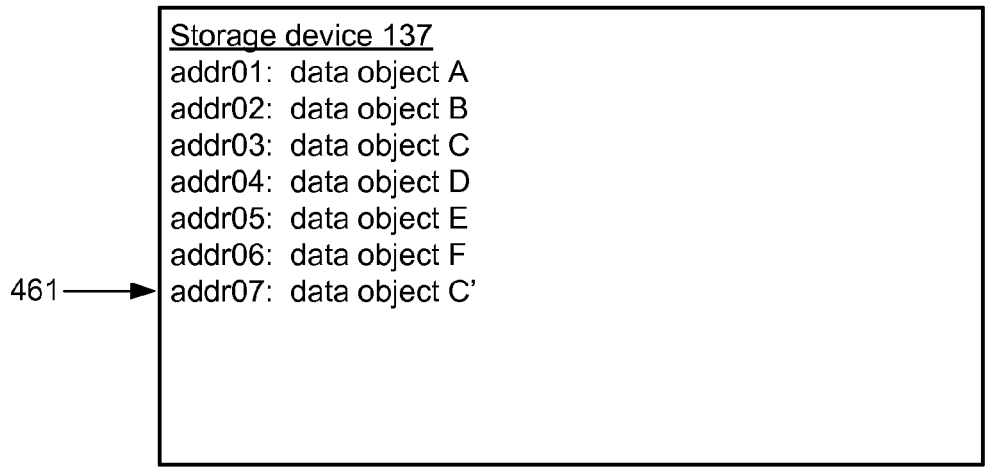

FIG. 4E illustrates an I/O operation 460, which is a write request by storage volume 1 to store the data object C'. The data object C' is a revised version of a previously stored data object C. The system determines that data object C' is a revised version of data object C because they use the same application data identifier. Otherwise, it would treat the incoming data object as a new data object G. However, the content of the data objects C' and C are different and, thus, the DOID of data object C' is different from the DOID of data object C. Accordingly, the data object C' is stored 461 at a new address addr07, rather than overwriting the data object C at addr03. A new entry 462 is also added to the SM catalog 241, mapping DOID[C] to the actual storage location addr07 of the data object C'.

However, because data object C' is a revised version of data object C, the entry 424 for data object C is also revised. The reference count 463 is decremented and the association entry 464 is updated to indicate that the data object C is not currently being referenced in storage volume 1. Because data object C' is a revised version of data object C, the request to write C' is effectively interpreted as a request to write C' coupled with a request to delete C.

Figure 4F:
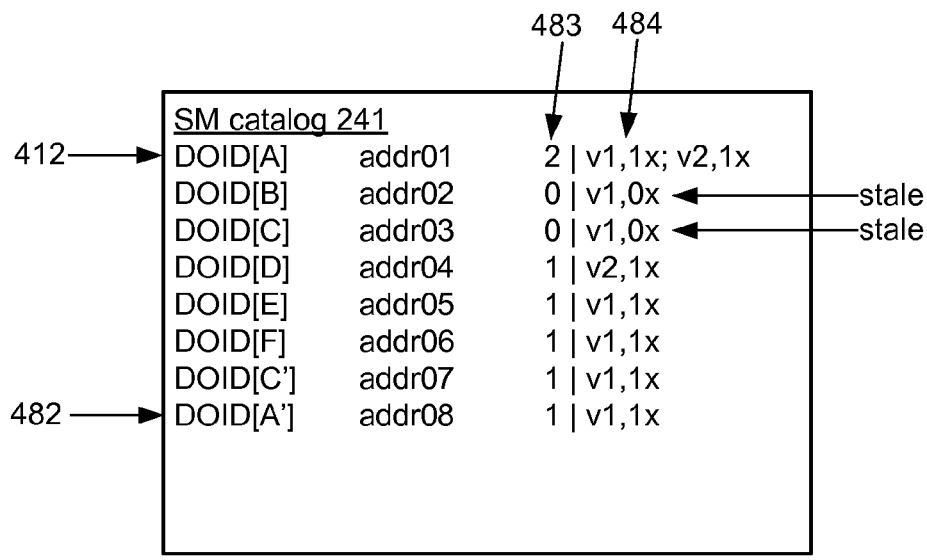

FIG. 4F illustrates an I/O operation 480 which is a write request by storage volume 1 to store the data object A'. The data object A' is a revised version of the data object A. This request is effectively interpreted as a request to write A' coupled with a request to delete A. This situation is similar to FIG. 4E, except that data object A is referenced multiple times. The writing of A' is straightforward and results in storing 481 data object A' with a corresponding entry 482 in the SM catalog 241.

The entry 412 for data object A in SM catalog 241 is also updated. Prior to this I/O operation, the reference count 483 and association data entry 484 of the data object A indicated that the data object A was being referenced 3× in total: twice in storage volume 1 and once in storage volume 2. As a result of this I/O operation 480, which is a request by storage volume 1, the reference count 483 is decremented and the association data entry 484 is updated to indicate that the data object A is currently being referenced 2× in total: once in storage volume 1 and once in storage volume 2.

FIGS. 4A-4F show examples of requests to write and to delete data objects. Normal I/O operation typically will also include requested to read data objects. These are not shown in FIGS. 4A-4F for purposes of clarity. For example, in FIG. 4F, if there was a request to "Read D," the actual storage location of data object D (addr04) would be determined from the SM catalog 241 and then data object D would be retrieved from that storage location.

FIG. 4F shows the SM catalog 241 and storage device 137 after processing of all I/O operations in the I/O queue 402. Data objects for which reference counts are zero are stale. Data objects for which reference counts are non-zero are active. In FIG. 4F, data object B and C are stale. The spaced used to store stale data objects can be recovered by compaction processes that keep only active data objects. In some embodiments, compaction processes remove any object data object that is stale. In other embodiments, data objects must be stale for a certain grace period of time before they are removed by compaction processes. The grace period may be determined from a lifecycle policy associated with a storage node or a storage volume. In various embodiments, compaction processes use shadow storage areas and throttle between compaction and I/O operations (or requests) to reclaim physical storage space without degrading I/O performance and increasing average latency for I/O operations. Compaction processes are described in detail with reference to FIGS. 5 through 6D.

Figure 5:
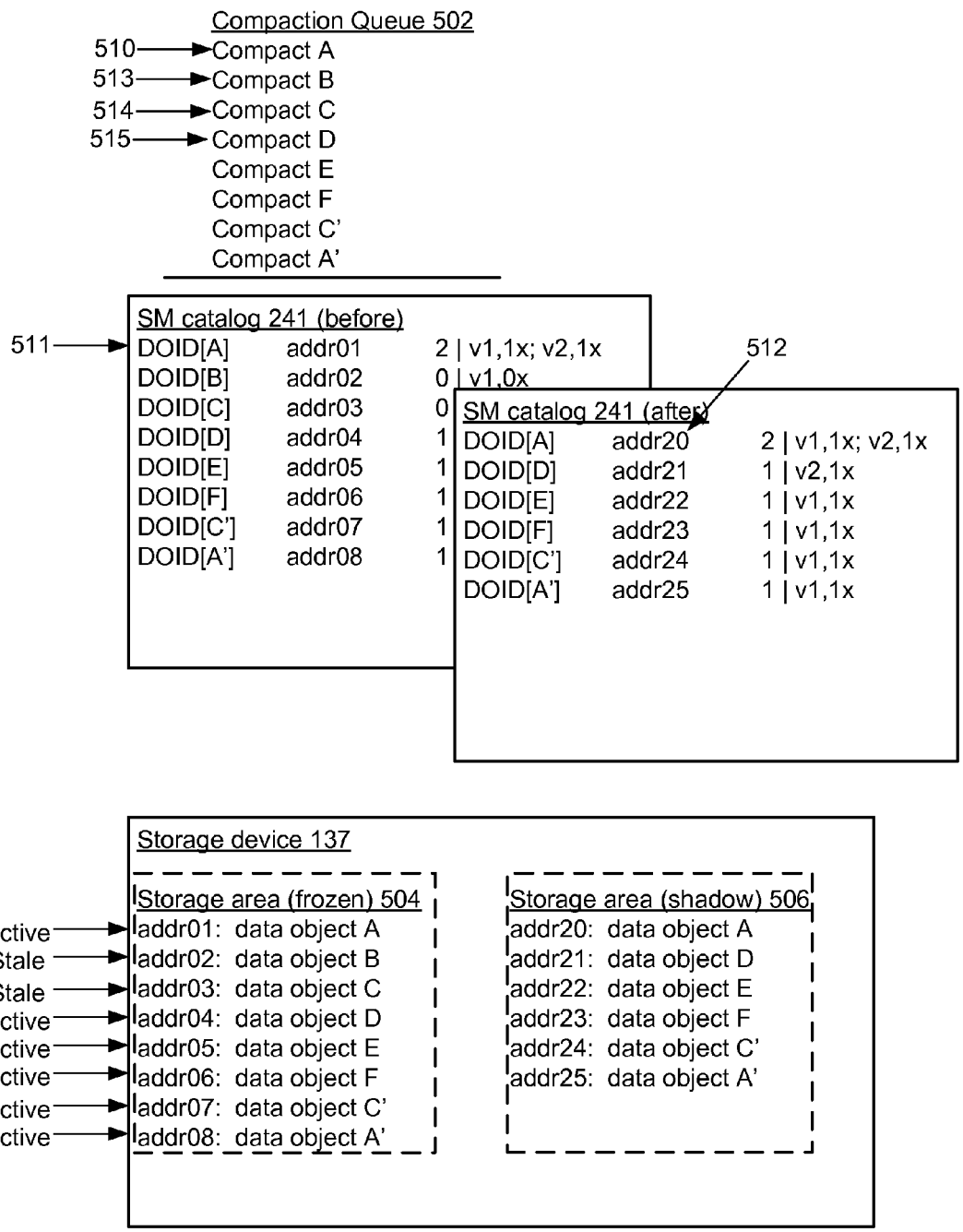
FIG. 5 is a diagram illustrating compaction of data objects using a shadow storage area.

FIG. 5 illustrates a compaction process using a shadow storage area. In FIG. 5, the SM catalog 241 (before) shows the state of the SM catalog 241 at the end of FIG. 4F, which is before the compaction process is run. The SM catalog 241 (after) shows the SM catalog 241 after the compaction process is completed. The storage area (frozen) 504 is where the data objects were stored at the end of FIG. 4F, which is before the compaction process is run. During the compaction process, the active data objects are transferred from this frozen storage area 504 to a shadow storage area 506. Stale data objects are not transferred. After the transfer is complete, the frozen storage area 504 may be released for re-use. Note that SM catalog 241 (before) and SM catalog 241 (after) show the SM catalog 241 before and after the compaction process. However, the frozen storage area 504 and the shadow storage area 506 are not before and after versions of the same storage area. Rather, they are two different storage areas within the storage device 137.

The compaction process is implemented using a compaction queue 502, which includes compaction requests for the data objects being compacted. Each data object included in the compaction request is processed by referencing the SM catalog 241 to determine whether the data object is active or stale. Active data objects are transferred from the storage area 504 to the shadow storage area 506 whereas stale data objects are not. For active data objects that have been transferred to the shadow storage area, the SM catalog is updated with their new actual storage locations in the shadow storage area. SM catalogs are updated to remove stale data objects.

For example, the first request 510 in compaction queue 502 is "Compact A." The data object A is determined to be active because its reference count in SM catalog entry 511 indicates it is currently referenced. Therefore, the data object A is copied from the frozen storage area 504 to the shadow storage area 506, where it is stored at the actual storage location addr20. The SM catalog 241 is then updated with the actual storage location 512, which in this case is addr20.

The next request 513 is "Compact B." However, data object B is stale because its reference count is 0. Therefore, data object B is not copied to the shadow storage area 506. The same is true for the compaction request 514 "Compact C."

Data object D is active, so the compaction request 515 "Compact D" results in copying of data object D to the shadow storage area 506 at addr21. The SM catalog 241 is also updated to reflect the new actual storage location. This process is repeated for the remaining compaction requests in the compaction queue 502. FIG. 5 shows the SM catalog 241 and storage device 137 after all compaction requests in the compaction queue 502 have been processed. The shadow storage area 506 stores only the active data objects, and the SM catalog 241 is updated to reflect this.

During the compaction process of a storage area, the original storage area 504 is frozen such that no data objects can be written into the storage area but data objects which have not yet been transferred can be read from the storage area. Once the compaction queue 502 is completely processed, the original storage area 504 is freed up for re-use and operation cuts over fully to the shadow storage area 506.

FIG. 5 illustrates processing of a compaction queue 502. In production operation, compaction requests to recover physical storage space (as illustrated in FIG. 5) are typically processed interspersed with I/O requests to read, write and delete data objects (as illustrated in FIG. 4). The processing of compaction requests and I/O requests preferably are throttled to have acceptable performance degradation to I/O operations. For a storage node, compaction requests preferably do not consume more than 10% of the maximum I/O operations per second. For a storage node, compaction requests preferably do not increase average latency for I/O operations by more than 10%. In various embodiments, data objects are organized into storage volumes, and the compaction process preferably does not cause a failure to meet performance requirements for any storage volume.

The rate of performing space recovery can be adjusted. For a storage node, the ratio of I/O operations to compaction operations can be adjusted. In one approach, each storage node is divided into partitions (or tokens) and storage space is recovered on a per-token basis. Each storage manager has a set of tokens assigned to it, and the data objects belonging to that token will be stored in that SM. Further, each token has a unique mapping to storage devices, meaning objects belonging to that token are stored in that storage device. Each token also has a catalog and an active storage area/partition. The rate of compaction occurring at the storage node can be throttled by adjusting the number of tokens that are undergoing compaction at any given time. The throttling can be done automatically or manually, for example by an administrator for the storage environment.

FIGS. 6A-6F are diagrams illustrating compaction requests interspersed with I/O requests. Because compaction requests are processed interspersed with I/O operations, I/O operations may request to read and write data objects that are among the data objects scheduled for compaction. Active data objects that are to be transferred from the frozen storage area to the shadow storage area, but which have not yet been transferred, are read from the frozen storage area. Active data objects that have already been transferred (copied) to the shadow storage area are read from the shadow storage area.

Figure 6A:
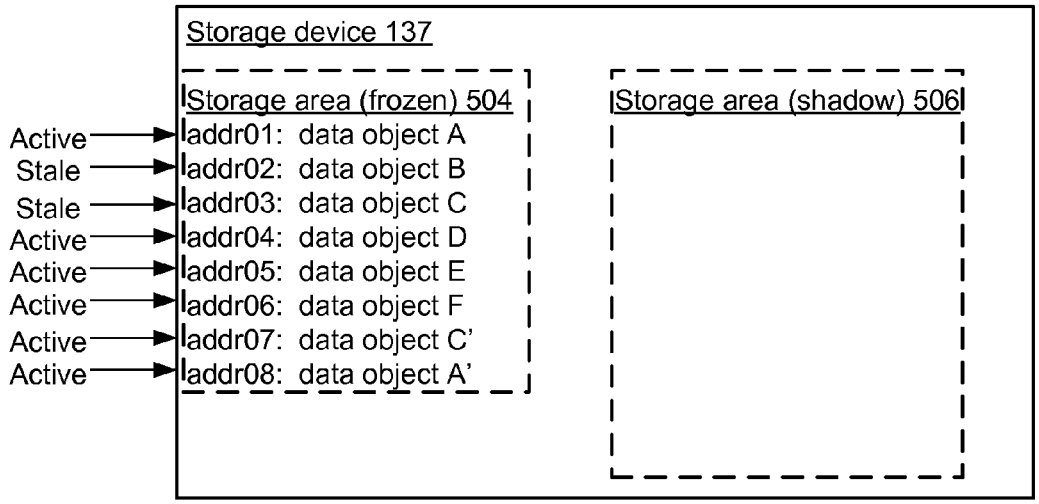

FIG. 6A shows the state of a storage system before compaction begins. The SM catalog 241 and storage device 137 are the same as at the end of FIG. 4F (or the beginning of FIG. 5). In this example, there is a compaction queue 502 of compaction requests, which is the same as in FIG. 5. However, there is also an I/O queue 402 of I/O requests which occur during the compaction process. The compaction requests and I/O requests are combined into a system queue 602 and processed from the system queue 602, as illustrated in FIGS. 6B-6E.

Figure 6B:
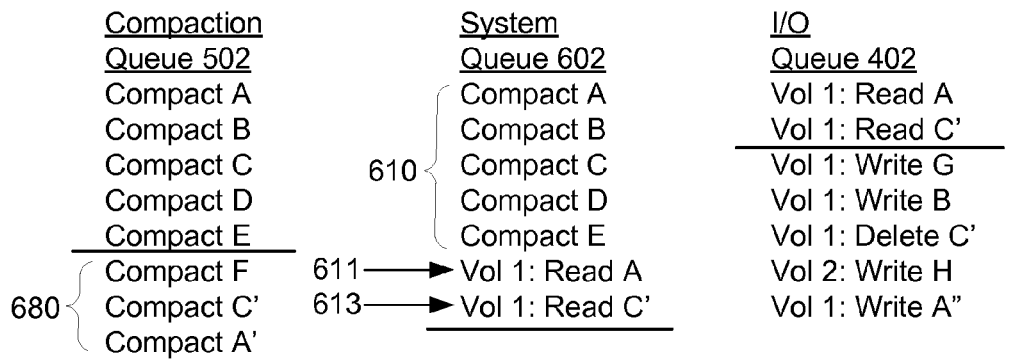
Figure 6B:
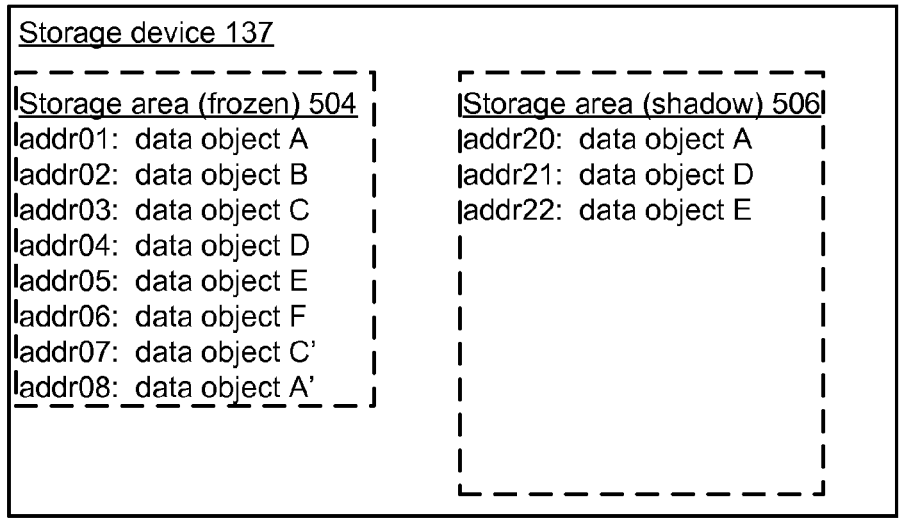

In FIG. 6B, the first five compaction requests and the first two I/O requests have been combined into the system queue 602. FIG. 6B illustrates processing of these requests. The system begins by processing the compaction requests 610, as described in FIG. 5. Active data objects A, D and E are copied from the frozen storage area 504 to the shadow storage area 506. The SM catalog 241 is updated to reflect the new storage locations for data objects A, D and E. Stale data objects B and C are not copied. Because compaction requests 680 have not been processed, active data objects F, C' and A' have not yet been copied from the frozen storage area 504 to the shadow storage area 506. The SM catalog 241 still indicates actual storage locations of data objects F, C', and A' in the frozen storage area 504. For clarity, addresses in the shadow storage area will be indicated by italics and indentation in the SM catalog 241.

The I/O request 611 is a read request from storage volume 1 to read the data object A. Because the data object A has been copied to the shadow storage area, the entry 612 in the SM catalog 241 indicates that its actual storage location is addr20. Data object A is thus read from the shadow storage area 506. The I/O request 613 is a read request from storage volume 1 to read the data object C'. Because the compaction request for data object C' has not yet been processed, the entry 614 in SM catalog 241 indicates that its actual storage location is addr07. The data object C' is read from the actual storage location addr07, which is in the frozen storage area 504.

Figure 6C:
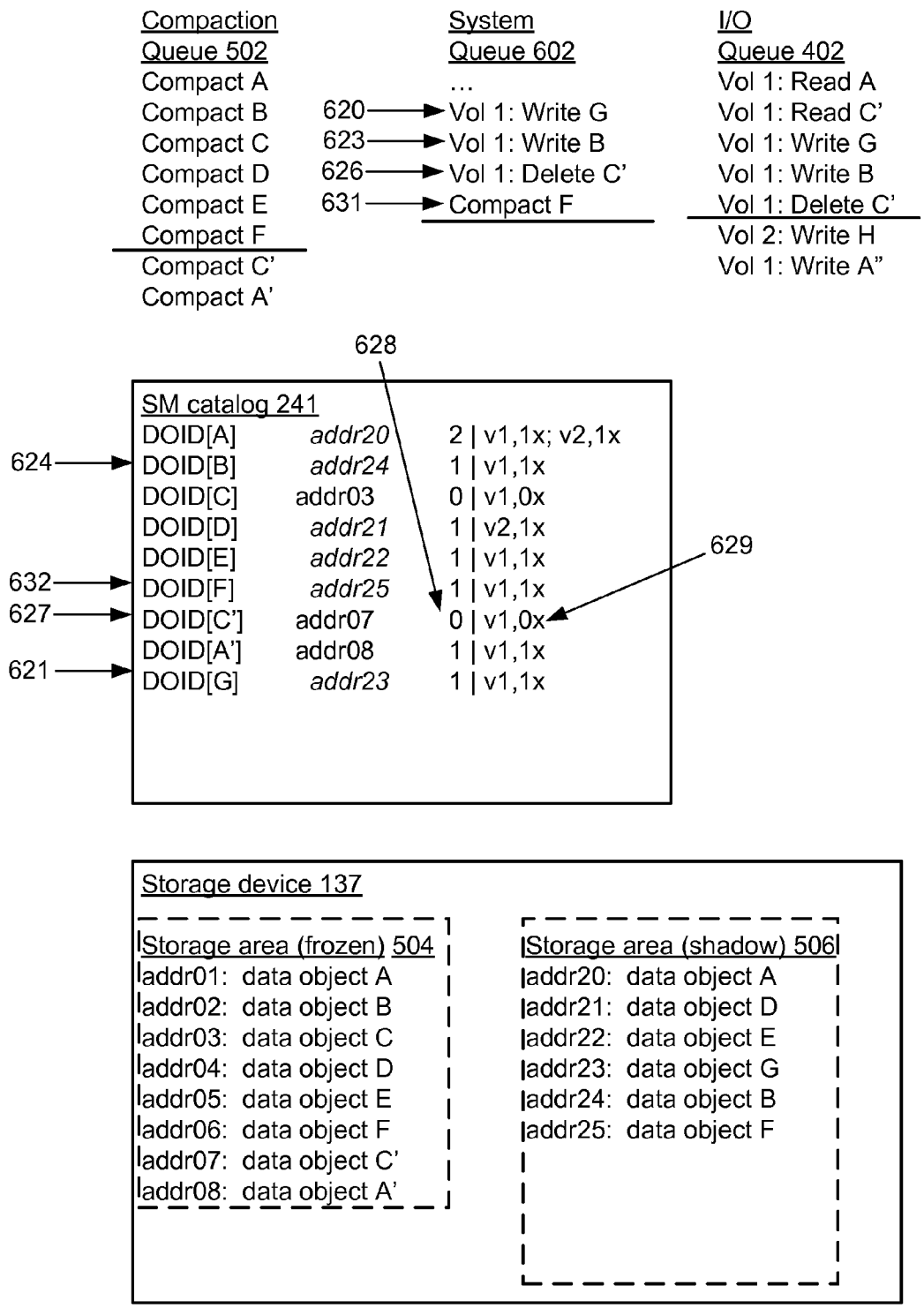

FIG. 6C shows processing of the next one compaction request and the next three I/O requests. I/O request 620 is a write request from storage volume 1 to store a new data object G. When processing a compaction request to recover a storage area, I/O operations to write new data objects are fulfilled using the shadow storage area rather than the frozen storage area. The new data object G is stored in the shadow storage area 506 at the actual storage location addr23. The SM catalog 241 is updated with a new entry 621 for the data object G. The SM catalog 241 is further updated to include the reference count and the association entry for the data object G.

The next I/O operation 623 is a write request to store data object B. Writes are always made to the shadow storage area. In this case, data object B is stored in the shadow storage area 506 at addr24. The SM catalog entry 624 for the data object B is updated with the new actual storage location, reference count and association entry. It does not happen in this example, but if a "Compact B" request was encountered after I/O operation 623, data object B would not have to be transferred because it is already in the shadow storage area.

During compaction, I/O operations to delete data objects follow the same process as described with respect to FIG. 4. For example, the I/O operation 626 requests to delete the data object C'. As with a normal deletion process, the entry 627 for data object C' is updated. Specifically, the reference count 628 for data object C' is decremented and the association entry 629 for data object C' is correspondingly updated. The data object C' is an active data object that has not yet been transferred from the frozen storage area 504 to the shadow storage area 506. However, this does not affect the deletion process.

Finally, compaction request 631 is processed. Data object F is determined to be active, so it is copied to the shadow storage area 506 at addr25. The corresponding entry 632 in the SM catalog 241 is updated.

Figure 6D:
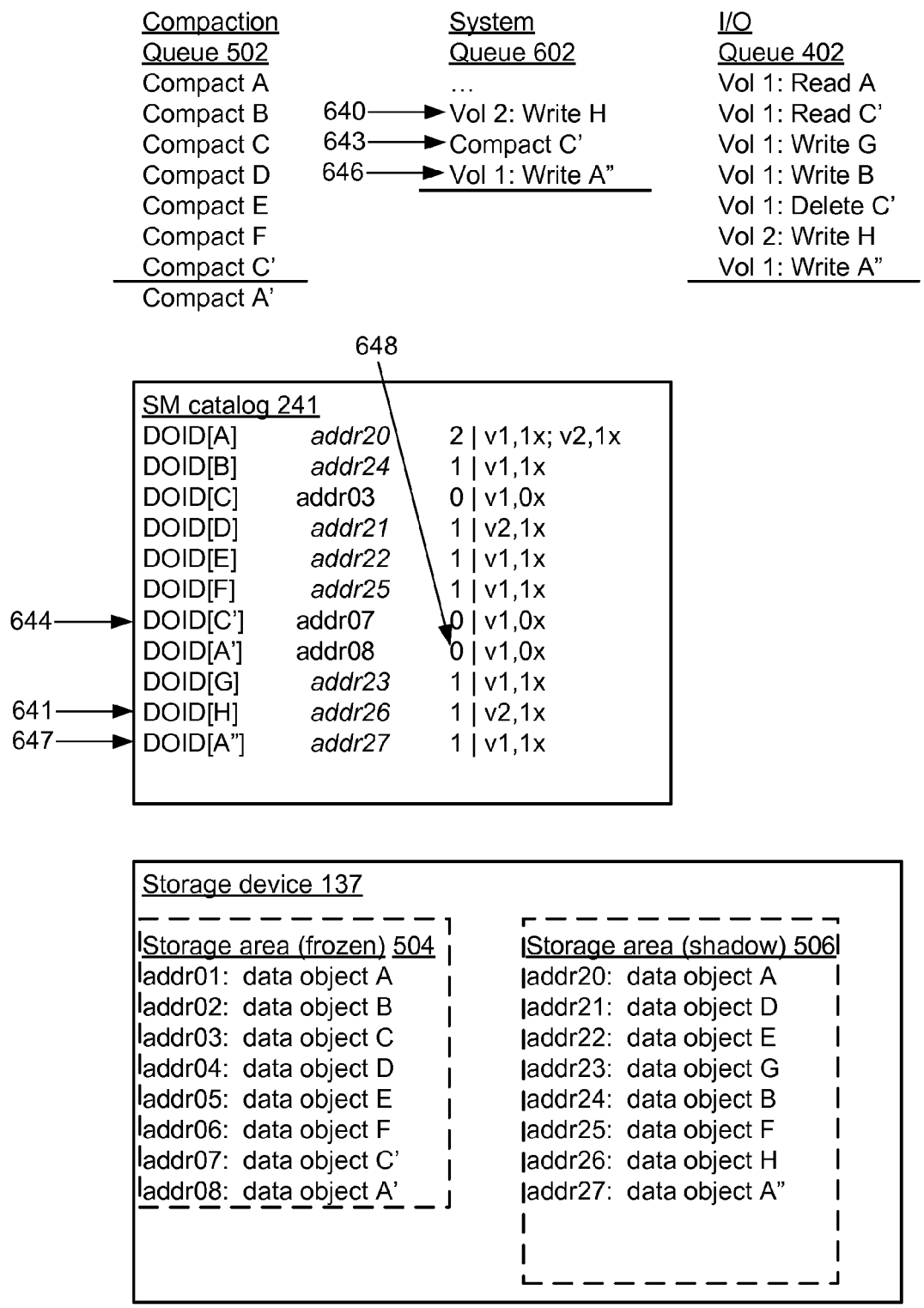

FIG. 6D shows processing of the next one compaction request and the next two I/O requests. Write request 640 stores data object H at addr26 and creates a corresponding entry 641 in the SM catalog 241.

The compaction request 643 could be handled in several ways. In one approach, it is determined that data object C' is now stale. As such, it is not transferred to the shadow storage area 506 and the SM catalog entry 644 remains unchanged. This is the approach shown in FIG. 6D. However, in an alternate approach, the data object C' is copied from the storage area 504 to the shadow storage area 506 even though the current reference count is 0. This might occur, for example, if the staleness determination is made before the I/O request to "Delete C'" is processed. In this approach, the stale data object C' would be copied to the shadow storage area 506 and the entry 644 would be updated accordingly.

I/O request 646 writes a new data object A". Data object A" is a modified version of data object A'. Therefore, this request is implemented as a request to delete data object A' and a request to write data object A". The data object A" is written into the shadow storage area 506 and the SM catalog 241 is updated with the mapping 647 between DOID[A"] and the actual storage location addr27. Deleting data object A' is implemented by decrementing the reference count 648 and updating the association entries.

FIG. 6E shows processing of the final compaction request 650, "Compact A'." Data object A' has a reference count of 0, so this situation is similar to the request "Compact C'" in FIG. 6D. That is, the data object A' is not copied to the shadow storage area 506.

Figure 6F:
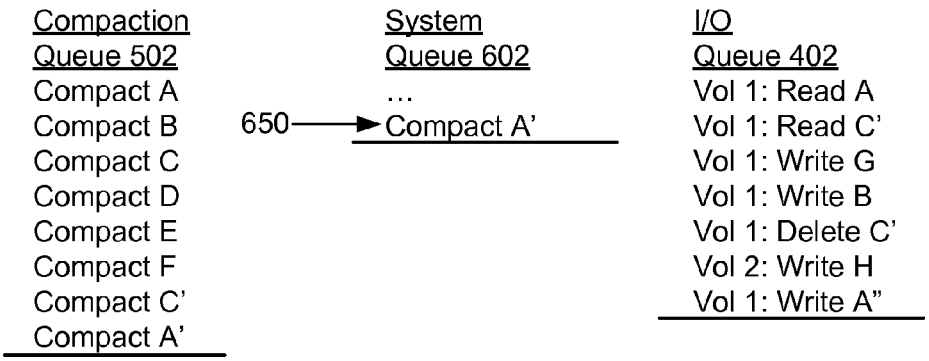
Figure 6F:
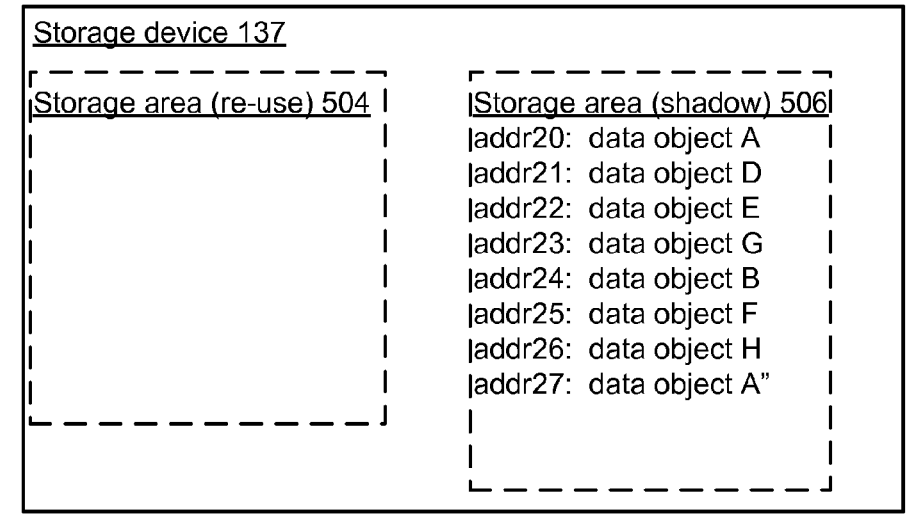

FIG. 6F shows clean up at the end of the compaction process. Space in the SM catalog 241 is recovered. In FIG. 6E, the entries for data objects C, C' and A' are not used, so that space is recovered in FIG. 6F. All active data objects have been copied over to the shadow storage area. The final compaction is followed by catalog adjustments and cutover to the shadow storage area as the active storage area. The original storage area 504 is available for re-use.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of managing storage of data objects to a data storage environment comprising a plurality of storage nodes, the method comprising:
    receiving write requests for data objects;
    storing the data objects at the storage nodes according to the write requests;
    updating a storage manager catalog that maps data object identifications (DOIDs) for the data objects with actual storage locations of the data objects, wherein the DOID for a data object is calculated based on content of the data object;
    wherein, if the data object is a revised version of a previously stored data object, the revised data object has a different DOID than the previously stored data object, the revised data object is stored at a different storage location than the previously stored data object and without overwriting the previously stored data object, and the storage manager catalog is updated to reflect that the previously stored data object has been superseded by the revised version by decreasing a count of a number of instances of the previously stored data object by one and increasing a count of a number of instances of the revised data object by one;
    identifying a storage area to recover storage space, the storage area storing data objects that are indicated as stale or active in the storage manager catalog; and
    recovering the storage space while fulfilling read and write requests;
    wherein the process of recovering storage space is implemented as compaction requests to compact the data objects from the storage area to a shadow storage area, the compaction requests being interspersed with read and write requests to the storage nodes, and
    wherein read requests for the active data objects are fulfilled from the storage area and write requests for new data objects are fulfilled using the shadow storage area during the process of recovering storage space.

2. The method of claim 1 wherein the process of recovering storage space does not consume more than ten percent of the maximum I/O operations per second for any storage node.

3. The method of claim 1 wherein the process of recovering storage space does not increase average latency for read and write requests to any storage node by more than ten percent.

4. The method of claim 1 wherein the data objects are organized into storage volumes, and the process of recovering storage space does not cause a failure to meet performance requirements for any storage volume.

5. The method of claim 1 further comprising adjusting a rate at which the process of recovering storage space is performed.

6. The method of claim 1 wherein read and write requests to the storage nodes are managed by a system queue, and the compaction requests and the read and write requests in the system queue are throttled according to QOS parameters.

7. The method of claim 1 wherein recovering the storage space comprises:
    for the storage area of a storage node containing the stale data objects:
        creating the shadow storage area;
        for each data object stored in the storage space:
            responsive to determining that the data object is active as indicated in the storage manager catalog, copying the data object from the storage area to the shadow storage area;
            responsive to determining that the data object is stale as indicated in the storage manager catalog, keeping the data object in the storage area without copying the data object to the shadow storage area; and
        after copying of the active data objects stored in the storage space to the shadow storage area is completed, cutting over from the storage area to the shadow storage area.

8. The method of claim 1, wherein write requests for all data objects are fulfilled using the shadow storage area.

9. The method of claim 1 wherein the storage nodes are divided into partitions, and the process of recovering storage space occurs on a per-partition basis.

10. The method of claim 9 wherein the partitions are identified by DOID locators.

11. The method of claim 9 wherein a rate at which the process of recovering storage space is performed is adjustable by adjusting a number of partitions per storage node for which storage space is being recovered.

12. The method of claim 1 wherein initiation of the process of recovering storage space is based on available storage capacity.

13. The method of claim 12 wherein the process of recovering storage space is initiated when available storage space falls below ten percent of the total storage capacity.

14. The method of claim 1 wherein initiation of the process of recovering storage space is based on time.

15. The method of claim 1 wherein the storage manager catalog includes a count of a number of instances of a data object that are currently referenced, and a data object is indicated as stale in the storage manager catalog when the count is zero.

16. The method of claim 15 wherein the storage manager catalog includes a count of a number of instances of a data object that are currently referenced, and a data object is indicated as stale in the storage manager catalog when the count has remained zero for a grace period.

17. The method of claim 15 wherein the data objects are organized into storage volumes, and the storage manager catalog includes a count of a number of instances of a data object that is currently referenced for different storage volumes.

18. The method of claim 1 wherein storing the data objects at the storage nodes comprises storing new data objects sequentially within each partition in the storage nodes.

19. The method of claim 1 wherein updating the storage manager catalog comprises adding entries for new data objects sequentially within the storage manager catalog.

20. A non-transitory computer-readable storage medium storing computer program modules for managing storage of data objects to a data storage environment comprising a plurality of storage nodes, the computer program modules executable to perform steps comprising:
receiving write requests for data objects;
storing the data objects at the storage nodes according to the write requests;
updating a storage manager catalog that maps data object identifications (DOIDs) for the data objects with actual storage locations of the data objects, wherein the DOID for a data object is calculated based on content of the data object;
wherein, if the data object is a revised version of a previously stored data object, the revised data object has a different DOID than the previously stored data object, the revised data object is stored at a different storage location than the previously stored data object and without overwriting the previously stored data object, and the storage manager catalog is updated to reflect that the previously stored data object has been superseded by the revised version by decreasing a count of a number of instances of the previously stored data object by one and increasing a count of a number of instances of the revised data object by one;
identifying a storage area to recover storage space, the storage area storing data objects that are indicated as stale or active in the storage manager catalog; and
recovering the storage space while fulfilling read and write requests;
wherein the process of recovering storage space is implemented as compaction requests to compact the data objects from the storage area to a shadow storage area, the compaction requests being interspersed with read and write requests to the storage nodes, and
wherein read requests for the active data objects are fulfilled from the storage area and write requests for new data objects are fulfilled using the shadow storage area during the process of recovering storage space.

21. A data storage environment comprising:
a plurality of application nodes that send application read requests and application write requests for data objects;
a plurality of storage nodes in communication with the application nodes, the storage nodes for storing the data objects organized as storage volumes, the storage nodes comprising:
a storage manager catalog that maps data object identifications (DOIDs) for the data objects with actual storage locations of the data objects, wherein the DOD for a data object is calculated based on content of the data object; wherein, if the data object is a revised version of a previously stored data object, the revised data object has a different DOID than the previously stored data object, the revised data object is stored at a different storage location than the previously stored data object and without overwriting the previously stored data object, and the storage manager catalog is updated to reflect that the previously stored data object has been superseded by the revised version by decreasing a count of a number of instances of the previously stored data object by one and increasing a count of a number of instances of the revised data object by one; and
a storage manager compaction module that identifies a storage area to recover storage space and recovers the storage space allocated for data objects that are indicated as stale in the storage manager catalog, wherein the process of recovering storage space is implemented as compaction requests to compact data objects stored in the storage area to a shadow storage area, the compaction requests being interspersed with read and write requests to the storage nodes,
wherein read requests for the active data objects are fulfilled from the storage area and write requests for new data objects are fulfilled using the shadow storage area during the process of recovering storage space.

* * * * *

UNITED STATES PATENT AND TRADEMARK OFFICE
CERTIFICATE OF CORRECTION

PATENT NO. : 9,817,578 B2
APPLICATION NO. : 14/732605
DATED : November 14, 2017
INVENTOR(S) : Vinay Pundalika Rao et al.

It is certified that error appears in the above-identified patent and that said Letters Patent is hereby corrected as shown below:

In the Claims

In Column 18, Line 26, in Claim 21, delete "DOD" and insert -- DOID --, therefor.

Signed and Sealed this
Eighth Day of May, 2018

Andrei Iancu
*Director of the United States Patent and Trademark Office*